I. WARD.
SLUG CATCHER.
APPLICATION FILED OCT. 31, 1910.
992,303.
Patented May 16, 1911.
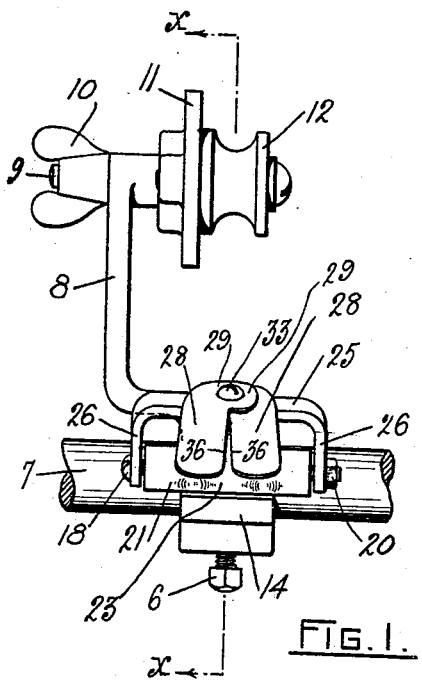
Fig. 1.
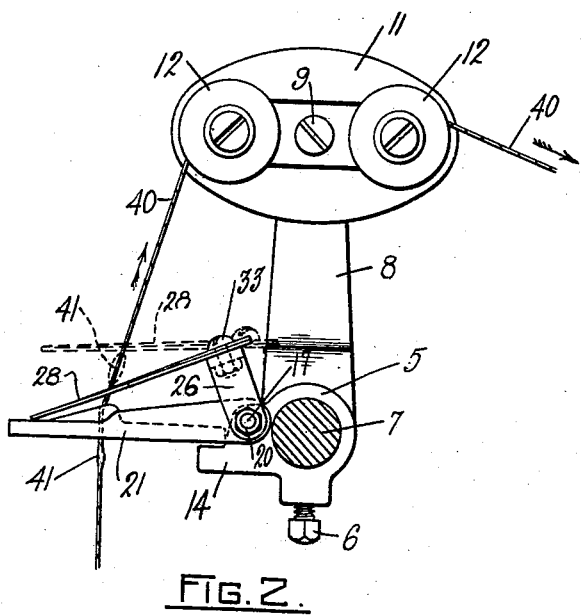
Fig. 2.
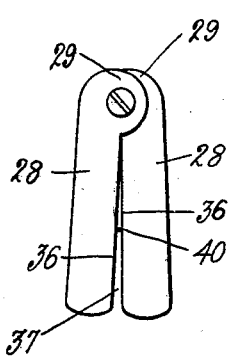
Fig. 3.
Fig. 4.
WITNESSES.
Albert G. Pieczynkowski
George H. McLaughlin.
INVENTOR.
Irving Ward
By Horatio E. Bellows
ATTORNEY.

UNITED STATES PATENT OFFICE.

IRVING WARD, OF PROVIDENCE, RHODE ISLAND, ASSIGNOR OF ONE-HALF TO DAVID S. SEAMAN, OF PROVIDENCE, RHODE ISLAND.

SLUG-CATCHER.

992,303.

Specification of Letters Patent. Patented May 16, 1911.

Application filed October 31, 1910. Serial No. 589,954.

*To all whom it may concern:*

Be it known that I, IRVING WARD, a citizen of the United States, residing at Providence, in the county of Providence and State of Rhode Island, have invented certain new and useful Improvements in Slug-Catchers, of which the following is a specification.

My invention relates to slug or bunch catchers purposed to intercept any bunch upon the traveling yarn or thread.

The essential objects of my invention are to provide a device which will operate with certainty; shall be efficient for yarn of different sizes; shall not be subject to undue wear by the yarn at any given point; shall be simple and inexpensive in construction; and be adapted to mounting upon guides of common construction without material reconstruction of the latter.

To the above ends my invention consists in such novel construction and combination of parts as fall within the scope of the appended claims.

In the accompanying drawings which form a part of this specification, Figure 1 is a front elevation of my novel catcher and of the guide upon which it is mounted, Fig. 2, a side elevation of the same in partial section on line $x$ $x$ of Fig. 1 showing in broken lines the position assumed by the parts when a bunch is engaged, and Fig. 3, a plan view of the catcher plates, and Fig. 4, a section on line $x$ $x$ of Fig. 1.

Like reference characters indicate like parts throughout the views.

My device may be used in conjunction with any desired or convenient form of thread guide. The form of guide herein shown comprises a sleeve 5 fixed by a set screw 6 to the rail 7, from which sleeve rises the bracket arm 8 to whose upper end is attached by the screw 9 and nut 10 the carrier plate 11 on which is mounted the guide knobs 12. Upon the sleeve 5 is a forwardly extending base 14 upon which is a boss 15 provided with an opening 16 through which loosely passes the pivot member 17 which in this instance has a head 18 upon one end and a nut 20 upon the opposite end. The usual guide plate 21 is pivotally mounted upon the pivot member, and rests upon the base 14. The guide plate has its forward portion bifurcated as at 23.

In conjunction with the above described familiar parts my novel device is in this instance shown. It comprises a yoke 25 whose arms 26 are loosely mounted upon the pivot member 17. One arm is intermediate the head 18 and the plate 21, and the other arm intermediate the plate and the nut 20. By tightening the nut 20 the yoke may be fixed at any desired inclination relatively to the plate 21. Upon the yoke are fixed two thin plates 28 provided with overlapping offset ends 29 which are provided with openings 31 in alinement with an opening 32 in the yoke 25 to receive a screw 33 provided with a nut 34 by which means the plates may be clamped at any relative angle to each other laterally. The inner or adjacent edges 36 of these plates, when the latter are normally disposed, diverge forming a V shaped opening 37 through which the yarn 40 passes. The course of the yarn is shown in Fig. 2 moving in the direction of the arrows. When a bunch 41 strikes the lower margin of the plates 28 the rearwardly converging edges 36 of the plates induct the yarn rearwardly to insure a firm engagement, and this result is further insured by the downward inclination of the plates 28 relatively the normal plane of the plate 21. The yoke 25 is prevented from excessive rearward travel by contact of the yoke with the arm 8.

It is important that the free end of the lower detector plate be as high or slightly higher than the upper plate, thus corresponding somewhat to the scissors principle.

What I claim is,—

1. In a device of the character described, the combination with the guide and guide plate, of a pivot member in the guide engaging the guide plate, a yoke upon the pivot member, and diverging detector plates fixed to the yoke and inclined with relation to the guide plate.

2. In a device of the character described, the combination with the guide and guide plate, of a pivot member in the guide upon which the guide plate is mounted, a head upon one end of the pivot member, a nut upon the other end of the pivot member, a yoke comprising two arms mounted upon the pivot member intermediate the guide plate, the head and the nut, and diverging detector plates mounted upon the yoke and extending over the guide plate.

In testimony whereof I have affixed my signature in presence of two witnesses.

IRVING WARD.

Witnesses:
HORATIO E. BELLOWS,
GEORGE H. MCLAUGHLIN.

Copies of this patent may be obtained for five cents each, by addressing the "Commissioner of Patents, Washington, D. C."